INVENTOR.
RICHARD H. REARWIN
BY
ATTORNEY.

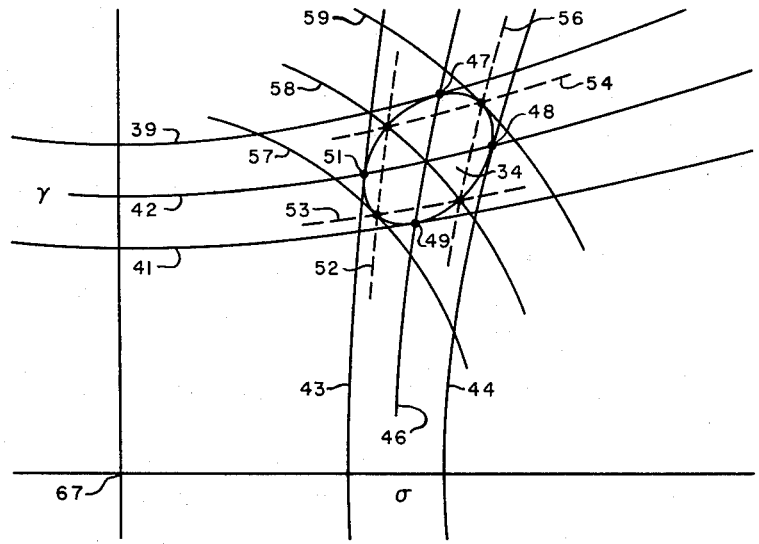
Fig-4
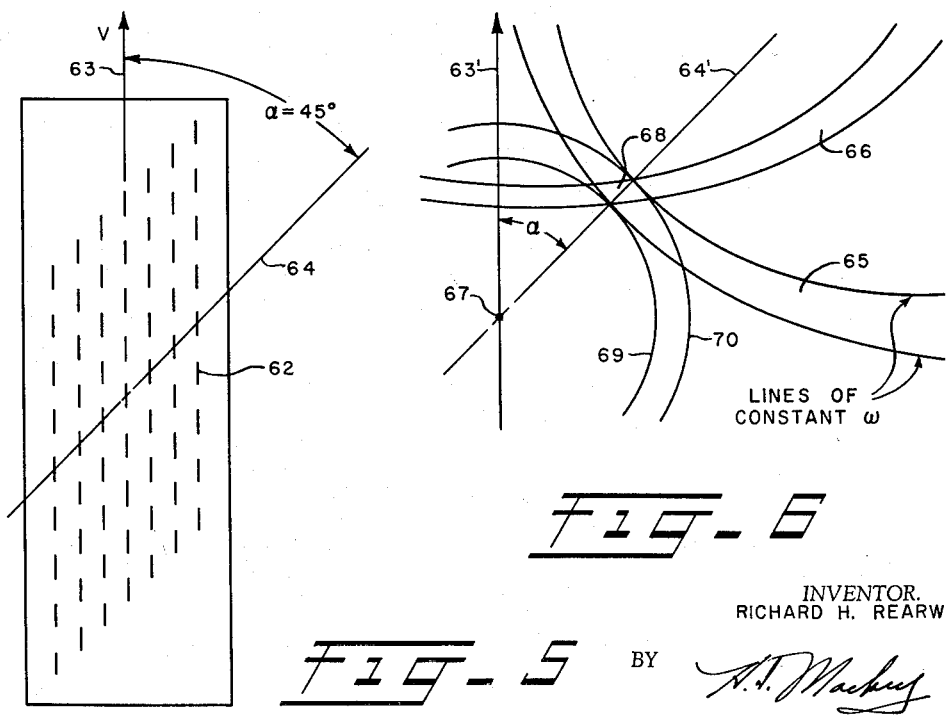
Fig-5
Fig-6

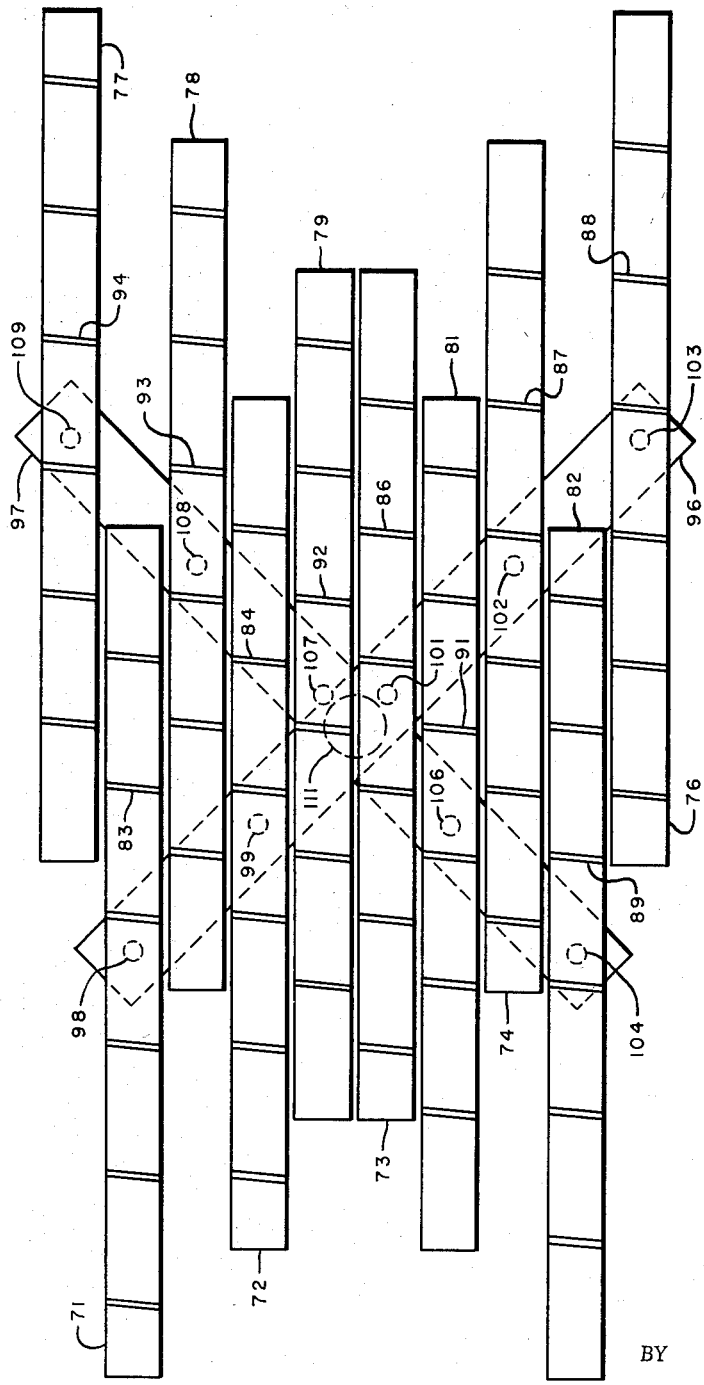

United States Patent Office 2,983,920
Patented May 9, 1961

2,983,920
PLANAR ARRAY OF MICROWAVE ANTENNAS

Richard H. Rearwin, Irvington, N.Y., assignor to General Precision Inc., a corporation of Delaware Filed Mar. 27, 1958, Ser. No. 724,478
6 Claims. (Cl. 343—824)

This invention relates to microwave antennas for use in continuous wave and pulsed Doppler radio systems, and more particularly to antennas designed to reduce or eliminate calibration shifts caused by altitude "holes" and sea reflection.

When microwave radio energy is reflected from a water surface the amount of energy returned to the receiver-transmitter depends not only on the distance but also on the angle of incidence at the water, being much reduced at acute angles. This is termed the sea reflection effect. When pulsed microwave echoes are received by the receiver-transmitter, the receiver being gated off during transmission, those parts of the echoes are lost which arrive at the receiver when it is gated off. This is termed the altitude hole effect.

Both the altitude hole effect and the sea return effect cause signal reduction and, what is more important, cause errors in the Doppler information contained in the echoes. These errors arise because of the selective attenuation of frequencies composing the Doppler spectrum.

Both types of errors are observed as an apparent change in the receiver-transmitter calibration, the apparent change being termed calibration shift. For example, if the receiver-transmitter is part of an aircraft navigation system indicating aircraft ground speed, the ratio between the Doppler difference frequency and the aircraft ground speed is the calibration constant, and apparent changes in this constant due to altitude hole and sea effects are termed calibration shifts. Such errors can amount to as much as 5%, and should be reduced as much as possible.

Methods heretofore employed for reducing calibration shift include frequency modulation of the pulse repetition rate to reduce altitude hole effect, alternating use of two lobes or beams of radiation a few degrees apart, and variations of the antenna design. The present invention falls in the last category. Its method is approximate and not exact, but it is so nearly exact as to reduce the calibration shift by one or two orders of magnitude. The invention provides a microwave planar array positioned horizontally in the aircraft. The planar array radiators are aligned in fore and aft rows which may be considered as radiating two hollow conical beams, fore and aft. The same radiators are so spaced as also to be aligned at an oblique angle of about 45°, and these lines of radiators may be considered as radiating two hollow conical beams one to the side and forward and the other in the opposite direction. These four beams combine to generate two narrow beams at their intersections. A similar group of radiators arranged to form two other beams is combined to form four beams altogether. These four microwave beams thus generated have the peculiar property of giving rise to echoes which are almost completely free of calibration shift errors.

The purpose of this invention is to provide a microwave antenna radiating beams the echoes of which have little or no altitude hole or sea return calibration shift.

A further understanding of this invention may be secured from the detailed description and associated drawings, in which:

Figure 4 is a ground illumination plan view illustrating the cause of calibration shift due to sea reflection or altitude holes.

Figure 5 schematically depicts in plan view one embodiment of the antenna of this invention.

Figure 6 is a ground plan illustrating the operation of the antenna of Figure 5.

Figure 7 depicts design details of the embodiment of Figure 5.

Figure 1:
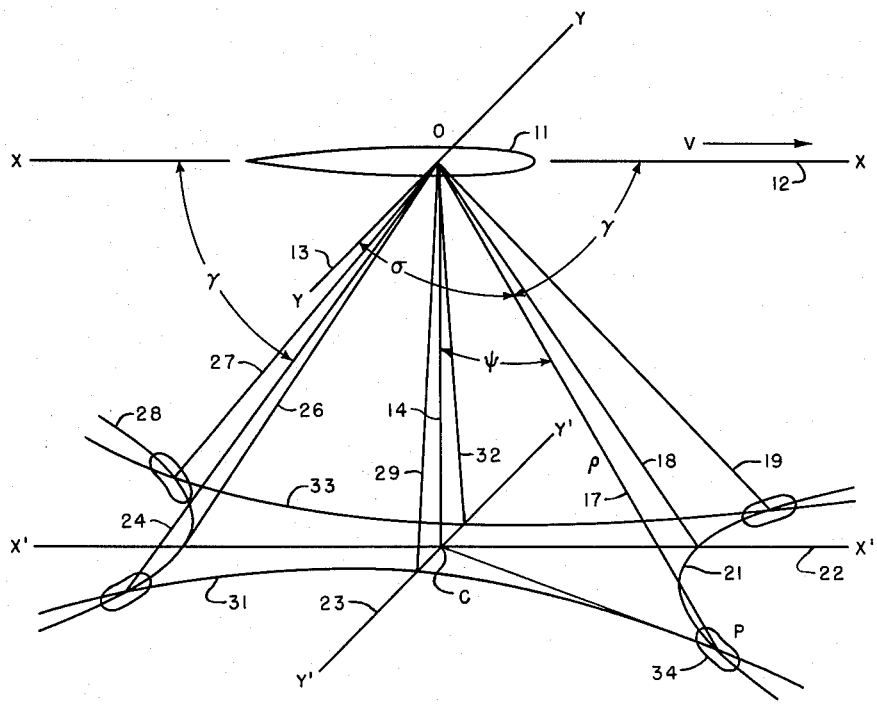
Figure 1 depicts the spatial relations of the radiated beams.

Referring now to Fig. 1, an aircraft 11 is pictured in level flight with velocity V. It contains microwave Doppler navigational equipment including an antenna. For simplicity of description the antenna is stabilized to a horizontal plane so that its fore-and-aft axis is substantially parallel to the longitudinal axis of the aircraft. Orthogonal axes fixed in the antenna include the $x$-axis 12 coincident with the antenna fore-and-aft axis, the $y$-axis 13 perpendicular thereto in a horizontal plane, and the $z$-axis 14 normal to both.

It is convenient and sufficient to employ a horizontally stabilized antenna in describing the principles of this invention, but it is not confined to use with such antennas. In fact, this invenion is instrumented with least error when employed with an antenna stabilized at all times to the velocity direction of the aircraft in which it is installed. Other types of antenna support and control may also be employed.

Figure 2:
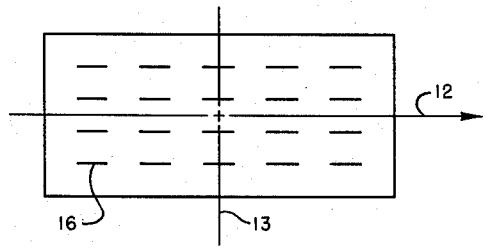
Figure 2 is a plan of a conventional planar microwave antenna.

One form of microwave planar antenna precedent to this invention is shown in Fig. 2. The plan of its radiating face comprises individual radiators 16 arranged in orthogonal rows. The fore-and-aft rows parallel to axis 12 constitute linear arrays arranged and fed to emit a pair of hollow semicones of radiation having axis 12 as the axis of both, with open ends pointing forward and aft. The transverse rows function as linear arrays positioned at right angles to axis 12, and radiate two hollow semi-cones on axis 13, with open ends pointing to one side and the other.

Referring again to Fig. 1, in which an antenna such as depicted in Fig. 2 is installed, the forward semi-cone of radiation is indicated by three elements 17, 18 and 19 and by the hyperbola 21 of intersection of the semi-cone with the earth plane defined by the ground track 22 and the transverse $y'$ axis 23. Similarly the rear semi-cone is defined by elements 24, 26 and 27, and by the hyperbolic intersection line 28. The right side cone has elements 24, 29 and 17, and hyperbolic intersection 31. The left side cone has elements 27, 32 and 19, and hyperbolic intersection 33. The half angles of the forward and rear cones are equal and termed $\lambda$. The half angles of the side cones are equal and termed $\sigma$.

The space phases of the cones of radiations are so arranged that, at the four common elements 17, 24, 27 and 19, the combined radiations are in phase. These four elements therefore define microwave beams, and in practice these four beams constituted substantially all of the radiation. Under the described conditions all four of these beams 17, 24, 27 and 19 make the same angle, $\psi$, with the normal axis 14.

The purpose of beaming microwave energy to the earth and receiving echoes thereof is to secure Doppler difference frequency information from the echoes, from which the aircraft speed in its velocity direction may be calculated. The relation between the Doppler frequency shift $\nu$ in a beam echo, the aircraft speed V and the angle $\gamma$ is $$\nu = \frac{2V}{\lambda} \cos \gamma \qquad (1)$$

in which $\lambda$ is the radio wavelength employed. That is, the Doppler frequency $\nu$ depends only on the one angle $\gamma$ in the geometry shown.

Reflection of microwave energy from water is far from isotropic, so that, in the triangle OCP, the amplitude of the echo is a function of the angle OPC and therefore of its complement $\psi$. Thus sea return calibration shift is a function of $\psi$.

Pulsed microwave systems employ receivers which are made insensitive, or gated off, during transmitting pulses. When the round trip travel time of microwave energy along the slant range OP is such that the return energy reaches the receiver during its gated-off time, that part of the signal is lost. But the beam 17, although narrow, does have a width of several degrees. This is indicated by the area 34 representing the ground area illuminated by the beam having a center indicated by the line 17. Since the slant ranges to various parts of this area 34 are different, echoes from different parts of the area are received at the aircraft at different times. In the triangle OCP, the slant range $\rho$ bears the relation to altitude, $h$, and $\psi$:

$$\frac{h}{\rho} = \cos \psi \qquad (2)$$

Therefore at any altitude the slant range is inversely proportional to cos $\psi$, and at the edge of a receiver time-gate the echo return varies as a function of $\psi$. Since as drawn a variation in $\psi$ also represents a variation in $\gamma$, the average or median Doppler return $\nu$ is affected in accordance with Equation 1. Thus altitude hole calibration shift is a function of $\psi$.

Figure 3:
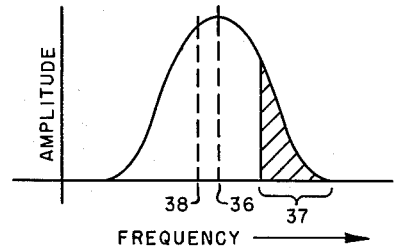
Figure 3 is a frequency vs. amplitude graph of a Doppler echo spectrum.

In the use of Doppler radio the received spectrum is very broadband, having generally the nearly Gaussian form of Fig. 3. Therefore means must be employed in the receiver to find the average or center spectrum frequency. Since the echo frequency may change with time, its center frequency must also be followed or tracked. The receiver component which finds and tracks this center frequency is termed the frequency tracker. When the entire Gaussian spectrum is received, the frequency tracker finds and tracks the median frequency 36, but when because of sea return or altitude hole effect a portion, such as the cross hatched portion 37 of the spectrum is missing or attenuated, the frequency tracker finds the center frequency 38 of what remains of the spectrum. The difference between frequencies 36 and 38 constitutes the calibration shift.

It may be shown algebraically that the precedent antenna of Fig. 2 emits beams of radiation in which the return energy in the frequency spectrum, $P(\nu)$, is an inseparable function of $\gamma$ and $\psi$, or $$P(\nu) = F(\gamma) G(\gamma, \psi) H(\psi) \qquad (3)$$

This is most easily understood however, by inspecting the geometry of the irradiated area 34, Fig. 1. This area 34 is reproduced, approximately to scale for $\gamma = \sigma = 65°$, in Fig. 4. The lines 39 and 41 represent the 3 db power limits of the forward hollow semi-cone of radiation having an average $\gamma$ angle of 65° at which radiation is maximum, represented by the center line 42. The lines 43 and 44 represent the 3 db power limits of the right side hollow semi-cone of radiation having an average $\sigma$ angle of 65° at which radiation is maximum, represented by the center line 46. Since the area 34 represents the inphase power product, the points 47, 48, 49, and 51 receive power 3 db below the power at the center of the spot. Similarly the intermediate points at the four intersections of the 1½ db power limits shown as dashed lines 52, 53, 54 and 56, are 3 db down, and the eight points define the egg-shaped locus of a 3 db line around the area. Similarly, other loci at other power levels can be drawn.

Inspection now makes reasonably evident that any selected $\sigma$ angle hyperbola cuts the area in such a way that the power along the $\sigma$ hyperbola has an average value corresponding to that of the average $\gamma$ hyperbola, 42. That is to say, the frequency spectrum will have the regular Gaussian form and in accordance with Equation 1 the median Doppler frequency will correspond to that given by Equation 1 employing the average $\gamma$ angle of line 42. This is on the basis that the cosine is nearly equal to the angle at small values of angle.

Successive $\psi$ angles are represented by the circles of constant $\psi$ numbered 57, 58 and 59. It is evident that they and all included circles cut the area 34 so that the average $\gamma$ angle along any circle differs from that of line 42 except at the area center. Thus varying $\psi$ varies the median Doppler spectral frequency. It thus is evident that, in receiving an echo signal, if almost any $\psi$ zone be omitted or attenuated due to sea or altitude hole effect, the median tracked frequency will be shifted.

Recapitulating, the precedent antenna beam can be described as the product of two separable functions in $\gamma$ and $\sigma$, and changes in $\sigma$ have no effect on the return frequency. But if the beam be described as the product of functions of $\gamma$ and $\psi$, they are inseparable. Since both sea return effect and altitude hole effect are functions of $\psi$, and changes in $\psi$ affect the effective $\gamma$, these effects cause large changes in the average return frequency.

Figure 5 schematically depicts an antenna embodying this invention. It is designed to emit two beams of microwave energy and is intended to be installed in the aircraft with the plane of the antenna horizontally stabilized. Linear rows of radiators represented by the dashes 62 constitute linear arrays pointed in a first direction which is the direction of the major or fore-and-aft antenna axis 63. The individual radiators are also aligned in a second direction which is the direction of the minor axis 64, which is at 45° in the plane of the planar array to the major axis 63. This distinguishes this antenna from the precedent antenna having axes at 90°.

In the operation of this antenna having radiators obliquely aligned, each of the linear arrays aligned in the major axis direction would by itself emit two hollow semi-cones of radiation having their axes coincident with the major axis 63. The forward semi-cone intersects the earth in a hyperbolic zone 66, Fig. 6, the point under the antenna in the earth plane being designated 67. This cone has a half-angle of $\gamma$ which determines the hyperbola 66. The radiators also being aligned in the direction of the minor axis 64, Fig. 5, each such row would by itself constitute a linear array emitting two hollow semi-cones having axes coincident with the minor axis. The right semi-cone intersects the earth in a hyperbolic zone 65, Fig. 6, and has a half-angle $\omega$ uniquely determining the hyperbola 65. At the intersection of the forward semi-cone and the right semi-cone the radiations are in phase and constitute a narrow beam striking the earth in the area 68. This beam lies in a vertical plane normal to the planar array which generates it, passing through the center of the array, this vertical plane comprehending the minor axis 64, Fig. 4, and being indicated as the line 64' in the plan of Fig. 6.

The circles 69 and 70 are circles of constant $\psi$ about the center 67, $\psi$ being the complement of $\omega$ along the axis 64'. These circles are drawn tangent to the hyperbolas enclosing the zone 65 so that at the illuminated area 68, near the points of tangency, there is almost negligible difference between the area enclosed by zone 66 and zone 65, and by zone 66 and circles 69 and 70. However, it has been indicated that when a beam is a separable function of $\gamma$ and $\psi$, calibration shift is nearly eliminated. Therefore, since at the points of tangency the beam becomes a separable function of $\gamma$ and $\psi$, at these points in the beam this antenna substantially eliminates all errors due to sea return and altitude holes. Near the points of tangency, throughout the area 68, even though the beam is strictly a function of $\gamma$ and $\omega$, it behaves much as though it were a function of $\gamma$ and $\psi$, and the echoes from the beam are substantially free of calibration shift due to sea return and altitude hole effect.

The planar array indicated in Fig. 5 radiates two beams, one to the right front and one to the left rear. To radiate two more beams to the left front and right rear it is necessary to add a similar planar array for this purpose. The linear arrays of the two planar arrays may consist of rectangular waveguides with narrow-side slot radiators, and individual waveguides of the two planar arrays are preferably interleaved to reduce the physical size of the composite antenna. Although the rectangular waveguide linear arrays may run in the direction of either the major or minor axis, with feed waveguides running in the direction of the other axis, it is preferred to run the waveguide linear arrays in the major axis direction for mechanical convenience.

The obliquity of the minor axis of a component planar array is termed $\alpha$, and has here been specified as 45° as an illustration. The optimum value of $\alpha$ is that which places the center of the beam at the point of tangency of the center of zone 69/70, Fig. 5, and the center of zone 65. As a general rule a value of $\alpha$ between 40° and 50° is satisfactory for the described antenna.

In the design of this combined planar array, when the angles $\gamma$ and $\psi$ have been specified $\omega$ is easily computed, being the complement of $\psi$. In order to cause the $\gamma$ hyperbola 66, Fig. 6, to intersect the $\omega$ hyperbola 65 at a point on the ground axis 64', the angle $\alpha$ is computed by use of the geometric relation.

$$\cos \alpha = \frac{\cos \gamma}{\sin \psi} \quad (4)$$

A composite planar array to emit four beams is depicted in Fig. 7, which is a plan view of its radiating face. It is composed of two planar arrays, each of which may be composed of any suitable number of linear arrays. For example, one planar array comprises five linear arrays 71, 72, 73, 74 and 76, arranged as indicated in Fig. 5 to emit one beam to the right front and one to the left rear. Each linear array radiates from oblique shunt slots in one of its narrow faces. As each slot should have an effective length of one-half wavelength, and as such a length is longer than the width of the narrow waveguide face, each slot extends obliquely across the narrow face and for a short distance at each end into the broad faces of the waveguide. The waveguides are spaced apart somewhat so as not to short-circuit these slot ends. Slot spacing is computed to emit radiation at the required $\gamma$ angle in accordance with the equation $$s_1 = \pm \frac{\lambda}{2 \cos \gamma} \quad (5)$$

in which $s_1$ is the linear array slot spacing and $\lambda$ is the microwave length in free space. In order to emit two gamma cones the phase separation of the radiating slots is 0, $\pi$, $2\pi$, etc. Taper illumination is employed to reduce side lobes by varying the slants of the slots and thus their couplings.

The other planar array is composed of the remaining linear arrays 77, 78, 79, 81 and 82, and emits one beam forward and to the left and one aft and to the right. Spacing and phasing are identical with those of the first planar array.

In order to emit a pair of omega cones having their common axis at $\alpha$ degrees from the major axis, the slots of the first planar array are aligned in directions parallel to the minor axis. For example, slots 83, 84, 86, 87 and 88 are aligned toward the front right at 45° to the major axis. Similarly all slots of the second planar array are aligned parallel to its minor axis. For example, slots 89, 91, 92, 93 and 94 are aligned toward the front left at 45°.

Several methods of feeding microwave energy to the linear arrays are available. A preferred method employs two feed waveguides 96 and 97 shown dashed to indicate position on the non-radiating face of the antenna. Feed waveguide 96 is angled at $\alpha$ to the linear arrays and feeds linear array waveguides 71, 72, 73, 74 and 76 through coupling holes between the feed waveguide and the five respective array waveguides. These coupling holes are indicated as dotted circles 98, 99, 101, 102 and 103. Similarly, feed waveguide 97 is at $2\alpha$ degrees from feed waveguide 96 and at $\alpha$ degrees from the major axis. It feeds arrays 77, 78, 79, 81 and 82 through coupling holes represented by the dotted circles 104, 106, 107, 108 and 109. Spacing $s_2$ between the coupling holes in both feed waveguides is in accordance with the equation $$s_2 = \pm \frac{\lambda}{2 \cos \omega} \quad (6)$$

Additionally the phases of the coupling holes are $\pi$ radians apart. Taper illumination is employed to reduce side lobes.

It is not unusual in microwave Doppler devices of this nature to employ four beams radiated alternately in pairs. This permits demodulation by beating the echoes of a forward-and-aft beam in the so-called "Janus" method, and also permits determination of the ground track direction by comparing the Doppler frequency differences of right and left beams. It thus is desirable in the present design of antenna to excite the two sets of linear arrays in alternation.

To accomplish this the two feed waveguides 96 and 97 are center fed through a turnstile junction which is described in Radiation Laboratory, vol. 8, by Montgomery, Dicke and Parcell, on page 459. Briefly, a round waveguide, indicated by the circle 111 and perpendicular to the plane of the feed waveguides, is coupled to their interiors. Microwave energy is applied to the round guide in the $TE_{11}$ mode through a ferrite rotator. In one condition of the rotator the orientation of the $TE_{11}$ mode is such as to feed energy into the center of the feed waveguide 96, while in a condition of the rotator rotating the $TE_{11}$ mode field by 90° the microwave energy input is transferred to the feed waveguide 97.

With center feed of the feed waveguides, each half of each feed waveguide emits two beams, so that, for example, the right front beam is composed equally of energy from a so-called inphase array and an antiphase array. This is the condition for frequency stabilization, therefore this antenna, thus fed, provides Doppler information without error due to small changes in microwave frequency.

What is claimed is:

1. A microwave antenna comprising, a plurality of microwave radiators positioned in a plane facing a reflecting surface, said plane having a major axis and having an axis normal thereto extending to said reflecting surface, means applying microwave energy to said radiators whereby a first cone of radiation is generated having an axis coincident with said major axis, said first cone of radiation intersecting said reflecting surface, means applying microwave energy to said radiators whereby a fraction of a second cone of radiation is effectively generated having an axis coincident with said normal axis, said fraction of the second cone of radiation intersecting both said reflecting surface and said first cone, and means causing the energies in said first and second cones at their intersecting beam to be in phase and to be out of phase elsewhere whereby effectively echo reception is confined to said intersecting beam and has a spectrum median frequency which is not subject to calibration shift.

2. A microwave antenna comprising a planar array of microwave radiators forming rows in a first direction and also in a second direction, said directions being separated by an acute angle, said radiators being equally spaced in said first direction and equally spaced in said second direction, means energizing each row of radiators in said first direction to emit at least one hollow cone of radiation about said row constituting a first major lobe, and means energizing each row of radiators in said second direction to emit at least one hollow cone of radiation about said last-named row constituting a second major lobe, said first and second major lobes intersecting in a plane normal to said planar array comprehending the center thereof and said second direction.

3. A microwave antenna comprising an array of radiators in a plane, said radiators all forming straight rows of regularly spaced elements in first and second directions in said plane separated by an angle of between 40 and 50 degrees, and means energizing said radiators whereby each row in said first direction emits at least one hollow cone of radiation having a half-angle determined by element spacing and energy wavelength and each row in said second direction emits at least one hollow cone of radiation having a half angle determined by element spacing in that direction and by energy wavelength, said two hollow cones intersecting and combining in phase to form a beam in a plane normal to said planar array comprehending said second direction.

4. A microwave antenna comprising a planar array of radiators forming straight rows in first and second directions separated by an angle of 40 to 50 degrees, said radiators being regularly spaced in each direction, and means energizing said radiators at feed phases successively differing in each row by $\pi$ radians whereby each row emits two hollow cones of radiation axially aligned with the row direction and each having a half angle cosine equal to the wavelength of said feed energy divided by radiator spacing, the cone in said first direction intersecting the cone in said second direction to form an inphase beam in a plane normal to said planar array and comprehending said second direction.

5. A microwave antenna comprising a planar array of radiators forming straight rows in first and second directions separated by an angle of between 40 to 50 degrees, said radiators being regularly spaced by a first amount in said first direction and regularly spaced by a second amount in said second direction, and means energizing said radiators at feed phases successively differing by $\pi$ radians in both directions whereby each row of radiators in said first direction emits a pair of cones of radiation in opposite directions having a common axis in said first direction and having equal half-cone angle cosines equal to the wavelength of said feed energy divided by said first spacing amount and whereby each row of radiators in said second direction emits a pair of cones of radiation in opposite directions having a common axis in said second direction and having equal half-cone angle cosines equal to the wavelength of said feed energy divided by said second spacing amount, each cone in said first direction intersecting a cone in said second direction to form an inphase beam in a plane normal to said planar array and comprehending said second direction.

6. A microwave antenna in accordance with claim 5 in which the cosine of said angle separating the first and second directions is equal to the cosine of the half angle of said pair of cones in said first direction divided by the sine of the angle made by said inphase beam with the direction perpendicular to said planar array.

References Cited in the file of this patent
UNITED STATES PATENTS

| | | |
|---|---|---|
| 2,408,435 | Mason | Oct. 1, 1946 |
| 2,834,014 | Thorne | May 6, 1958 |